(12) United States Patent
Freeman

(10) Patent No.: US 6,349,501 B1
(45) Date of Patent: Feb. 26, 2002

(54) FLOWER STEM SUPPORTERS

(76) Inventor: Ephorm Freeman, 229 Ridgewood St. #306, Minneapolis, MN (US) 55403

( * ) Notice: Subject to any disclaimer, the term of this patent is extended or adjusted under 35 U.S.C. 154(b) by 0 days.

(21) Appl. No.: 09/447,245

(22) Filed: Nov. 23, 1999

(51) Int. Cl.[7] ................................................. A01G 5/04
(52) U.S. Cl. ..................................................... 47/41.01
(58) Field of Search .............................. 47/41.01, 41.1, 47/41.11, 41.12, 41.13, 41.14, 41.15

(56) References Cited

U.S. PATENT DOCUMENTS

| | | | | |
|---|---|---|---|---|
| 664,837 A | * | 1/1901 | Davis | 47/23 |
| 1,557,506 A | * | 10/1925 | Walthers | 47/41.01 |
| 1,769,198 A | * | 7/1930 | Albany | 47/55 |
| 1,892,393 A | * | 12/1932 | Halm | 47/41.13 |
| 2,273,368 A | * | 2/1942 | Mumford | 24/6 |

* cited by examiner

*Primary Examiner*—Charles T. Jordan
*Assistant Examiner*—Francis T. Palo

(57) ABSTRACT

Disclosed is a flower stem supporter which comprises a clasping mechanism that is integral with a long vertical portion. The long vertical portion is integral with a blossom supporter. The blossom supporter is integral with a short vertical portion. The short vertical portion is inserted in the base of the flower blossom for additional support of the blossom.

13 Claims, 2 Drawing Sheets

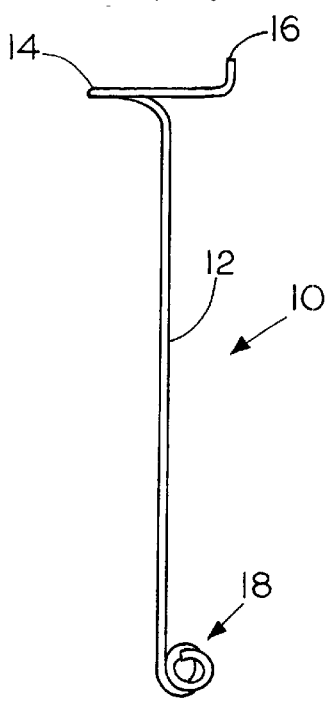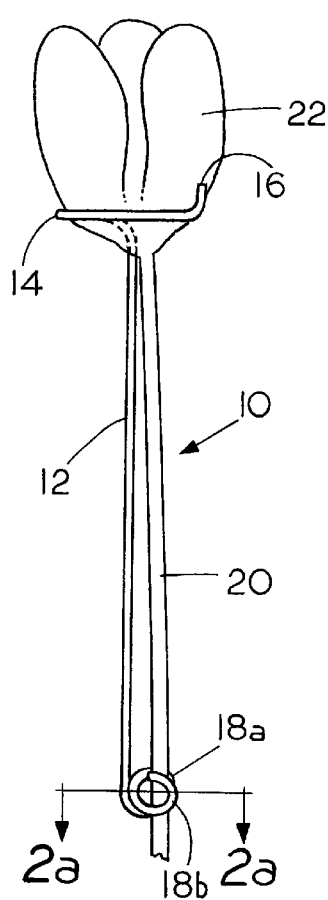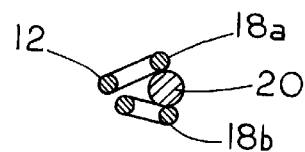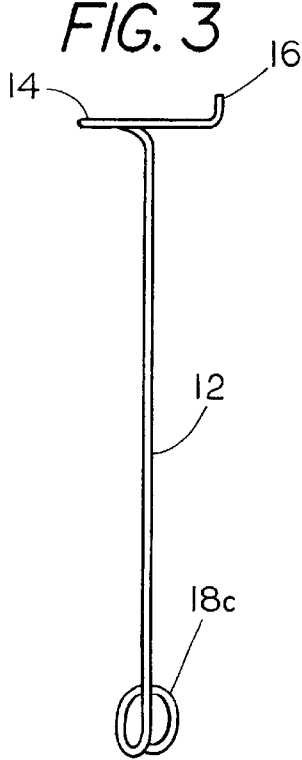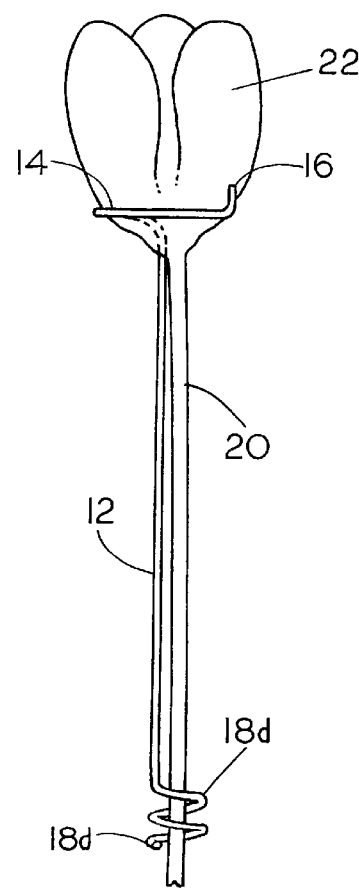

FLOWER STEM SUPPORTERS

FIELD OF THE INVENTION

The present invention relates to fresh cut flowers, and more particularly to supports for fresh cut flower stems.

BACKGROUND OF THE INVENTION

Many people purchase fresh cut flowers or they may cut flowers from their flower gardens. Often these flowers will drupe within a very short period of time even though they are still fresh and alive. They may droop in 24 hours or less because of improper absorption of water. I have determined that the droop occurs because of weakness developing in the stem just below the base of the flower.

Flowers which are recently cut and still fresh may droop. These flowers still smell beautiful and would still look beautiful if they were not drooping. Many people simply discard the flowers even though there is still good life left in the flowers. Some people try to prop the flowers up with very tall vases. Some people try to prop the flowers up using other flowers or greenery. Some people may even try to prop up the flowers by placing the flowers in a corner or by leaning the flowers against a single wall. No current method of supporting flowers and their stems is very effective.

SUMMARY OF THE INVENTION

The present invention relates to supporting flowers and their stems. The present invention comprises a thin rod which is shaped to support flowers and their stems. The present invention may be constructed of plastic, acetate or a plastic/acetate combination. The present invention may be a cylindrical tube that is approximately 1 ¼ inches in length. The cylindrical tube may be rolled to fit the neck of any flower after the flower has wilted. The purpose of the present invention is to support the flower's neck to keep it in place for aesthetic beauty and longevity. The present invention may be compared to a human neck brace in practice, only for a flower after it has wilted.

IN THE DRAWINGS

FIG. 1 shows a side view of the flower stem supporter.

FIG. 2 shows a side view of the flower stem supporter in use.

FIG. 2a shows a sectional view taken along the line 2a—2a in FIG. 2.

FIG. 3 shows a side view of the flower stem supporter with a variation in the clasping mechanism.

FIG. 3a shows a side view of the flower stem supporter with another variation in the clasping mechanism.

DETAILED DESCRIPTION OF THE PRESENT INVENTION

Figure 4:
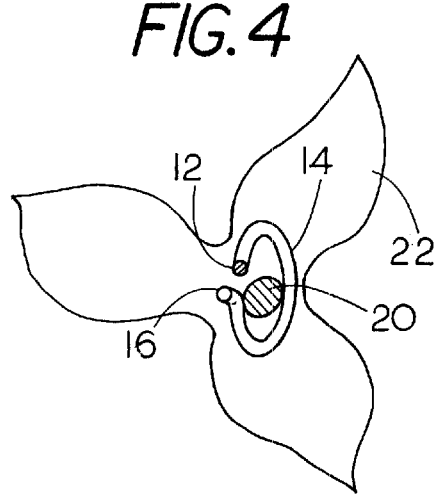
FIG. 4 shows a sectional view of the top portion of the flower supporter in use.

A flower stem supporter 10 of the present invention is illustrated in FIG. 1. A flower stem supporter 10 may be a continuous rod which has a short vertical portion 16. The continuous rod is bent at the base of the short vertical portion 16 to form a blossom supporter 14. The blossom supporter 14 is formed by bending the rod into a partial circle. A long vertical portion 12 extends downwardly from the blossom supporter 14. The continuous rod is bent into a clasping mechanism 18 at the lower portion of the long vertical portion 12.

A flower stem supporter 10 may include the clasping mechanism 18 that is integral with a long vertical portion 12 which is integral with a blossom supporter 14. The blossom supporter 14 is integral with the short vertical portion 16.

The flower stem supporter 10 may be constructed of a variety of materials. For example, the flower stem supporter 10 may be constructed of plastic or acetate or a combination of plastic and acetate. The flower stem supporter 10 may also be constructed of other materials such as various metals. The material selected for the flower stem supporter 10 should be slightly flexible or malleable. The preferred material for the flower stem supporter 10 is plastic or acetate. The flower stem supporter 10 preferably is of 18 gauge to 22 gauge metal wire.

The flower stem supporter 10 may be produced having a plurality of different overall lengths. The flower stem supporter 10 may be as short as one inch in length from the bottom of the clasping mechanism 18 to the top of the short vertical portion 16. The flower stem supporter 10 may be several inches in length. The flower stem supporter 10 may be up to twelve inches in length or longer for large stemmed flowers.

The flower stem supporter 10 may be produced with a plurality of different diameters though the diameter preferably is uniform for each individual flower stem supporter 10. The diameter may be less than ½ inch. The flower stem supporter 10 should be thick enough to support a flower.

The clasping mechanism 18 may be several different shapes. One shape for the clasping mechanism 18 may be a first vertical loop 18a and a second vertical loop 18b as shown in FIG. 2. The first vertical loop 18a and the second vertical loop 18b each may be circular, rectangular, oval, or other suitable shape. The clasping mechanism 18 is somewhat like the wings of a butterfly. A flower stem 20 (see FIG. 2 and FIG. 2a) may be placed between the first vertical loop 18a and the second vertical loop 18b. The first vertical loop 18a and the second vertical loop 18b should be sufficiently malleable so that they may be pinched together to hold the flower stem 20 in place.

A second shape for the clasping mechanism 18 may be a single vertical loop 18c and the lower portion of the long vertical portion 12 as shown in FIG. 3. The single vertical loop 18c may be circular, rectangular, oval or other suitable shape. A flower stem 20 may be placed between the lower portion of the long vertical portion 12 and the single vertical loop 18c. The lower portion of the long vertical portion 12 and the single vertical loop 18c may then be pinched together to hold the flower stem 20 in place.

A third shape for the clasping mechanism 18 may be a horizontal spiral 18d (see FIG. 3a). The horizontal spiral 18d may be circular or spiral shaped. A flower stem 20 may be placed within the horizontal spiral 18d. The horizontal spiral 18d may then be pinched together to hold the flower stem 20 in place. A fourth shape for the clasping mechanism 18 will be discussed in association with the second embodiment.

As seen in FIGS. 1, 2, 3, and 3a, the long vertical portion 12 is integral with and interconnected to both the clasping mechanism 18 and the blossom supporter 14. The long vertical portion 12 will generally be straight. The long vertical portion 12 may be the longest portion of the flower stem supporter 10. The long vertical portion 12 may be produced with a plurality of lengths. The long vertical portion 12 may be less than ¾ of an inch or more than twelve inches in length. The length of the long vertical portion 12 may be produced having generally the length at least one-third the length of the stem of the freshly cut flowers. The diameter of the long vertical portion 12 will preferably be uniform with the flower stem supporter 10. The diameter of the long vertical portion 12 will preferably be approximately ¹⁄₆₄th of an inch though it may be larger. The diameter may be as large as 1 ¼ inches.

The blossom supporter 14 is integral with the top portion of the long vertical portion 12. The blossom supporter 14 may be circular in shape so as to support the bottom of a blossom 22 as shown in FIGS. 2 and 4. If the blossom supporter 14 is circular, the diameter of the inside of the circle must be sufficient to allow a flower stem 20 with thorns, such as a rose, to fit through the circle. The diameter of the inside of the circle must be small enough to prevent the blossom 22 from slipping through the circle. Preferably the blossom supporter 14 will be an incomplete circle (semi-circular) which allows the user to slide the flower stem 20 into the blossom supporter 14. After sliding the flower stem 20 into the blossom supporter 14, the user may lower the bottom of the blossom 22 onto the blossom supporter 14.

As shown in FIGS. 1–4, the short vertical portion 16 is integral with the blossom supporter 14. The short vertical portion 16 must be long enough to be inserted into and engaged with the bottom portion of the blossom 22 as seen in FIGS. 2 and 4. The short vertical portion 16 may be shorter than ⅛ of an inch or longer than ½ of an inch. The preferred length of the short vertical portion 16 depends mainly upon the size of the bottom of the blossom 22 as seen in FIGS. 2 and 4. Generally the length of the short vertical portion 16 will be approximately ¼ of an inch.

While the flower stem supporter 10 is disclosed as being constructed of malleable metal, the supporter 10 may be constructed of any of many other materials. For example, the supporter 10 may be constructed of glass rod or ceramic. The blossom supporter 14 may include decorative mechanism such as artificial rubies or in some instances even true rubies or other stones mounted on the rod material. The long vertical portion 12 may also be of a decorative design. The long vertical portion may for example be of platinum or other valuable metal.

SECOND EMBODIMENT

Figure 5:
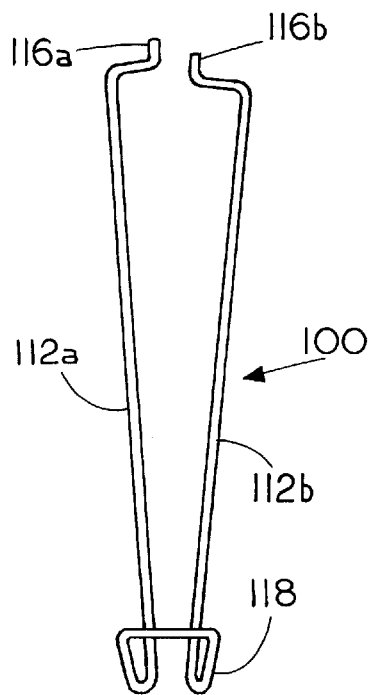
FIG. 5 shows a second embodiment of the present invention.

The second embodiment of the present invention is shown in FIG. 5. A flower stem supporter 100 may include a clasping mechanism 118 that is integral with two long vertical portions, a first long vertical portion 112a and a second long vertical portion 112b, which are integral with two short vertical portions, a first short vertical portion 116a and a second short vertical portion 116b respectively.

The flower stem supporter 100 may be constructed of any of a variety of materials. For example, the flower stem supporter 100 may be constructed of plastic or acetate or a combination of plastic and acetate. The flower stem supporter 100 may also be constructed of other materials such as various semi-flexible metals or malleable metals. The material selected for the flower stem supporter 100 should be slightly flexible or malleable. The preferred material for the flower stem supporter 100 is plastic or acetate.

The flower stem supporter 100 may be produced having any of a plurality of different overall lengths. The flower stem supporter 100 may be less than one inch in length from the bottom of the clasping mechanism 118 to the top of the two short vertical portions 116a and 116b. The flower stem supporter 100 may be several inches in length. The flower stem supporter 100 may be as long as twelve inches in length or longer.

The flower stem supporter 100 may be produced having any of a plurality of different diameters. The diameter preferably is constant for each individual flower stem supporter 100. The diameter may range from less than ¹⁄₆₄th of an inch to more than 1 ¼ inches. The flower stem supporter 100 should be rigid enough to support a flower.

Figure 6:
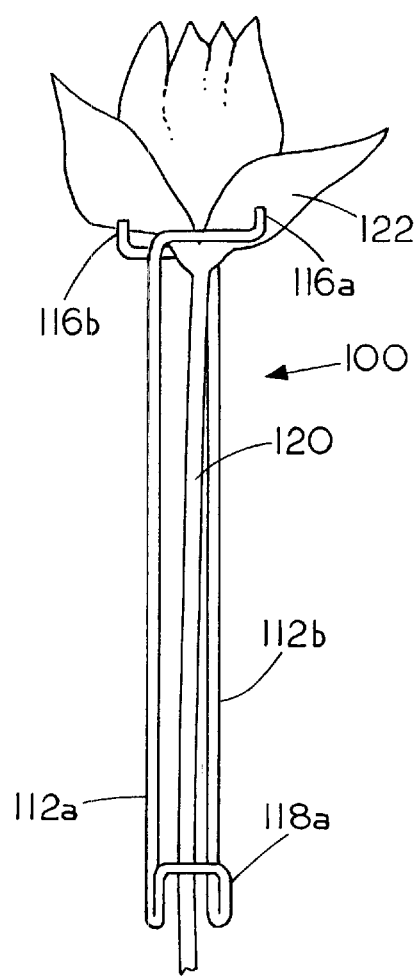
FIG. 6 shows the second embodiment of the present invention in use.

The clasping mechanism 118 may be of any of several different shapes. One shape for the clasping mechanism 118 may be comprised of one loop 118a as seen in FIG. 6. The one loop 118a may be circular, rectangular, oval, or other suitable shape. A flower stem 120 (see FIG. 6) may be placed between the one loop 118a and the lower portion of the two long vertical portions 112a and 112b. The one loop 118a and the two long vertical portions 112a and 112b may then be pinched together to hold the flower stem 120 in place.

The two long vertical portions 112a and 112b are integral with both the clasping mechanism 118 and the two short vertical portions 116a and 116b respectively. The two long vertical portions 112a and 112b will generally be straight. The two long vertical portions 112a and 112b may be the longest portion of the flower stem supporter 100. The two long vertical portions 112a and 112b may be produced of any of a plurality of lengths. The two long vertical portions 112a and 112b are preferably the same length. The two long vertical portions 112a and 112b may be shorter than ¾ of an inch or longer than seven inches in length. The length of the two long vertical portions 112a and 112b may be produced to be generally one-third of the length of freshly cut flowers. The diameter of the two long vertical portions 112a and 112b will preferably be uniform with the flower stem supporter 100. The diameter of the two long vertical portions 112a and 112b will preferably be approximately ¹⁄₆₄th of an inch.

The two short vertical portions 116a and 116b are integral with the two long vertical portions 112a and 112b respectively. The two short vertical portions 116a and 116b must be long enough to be inserted into the bottom portion of a blossom 122 as seen in FIG. 6. The two short vertical portions 116a and 116b may be shorter than ⅛ of an inch or as long as ½ of an inch. The two short vertical portions 116a and 116b are preferably uniform with each other in length. The preferred length of the two short vertical portions 116a and 116b depends mainly upon the size of the bottom of the blossom 122. Generally the length of the two short vertical portions 116a and 116b will be approximately ¼ of an inch.

While preferred embodiments of the present invention have been disclosed, one skilled in this art will recognize that modifications may be made without departing from the broader scope of the present invention.

That which is claimed is:

1. A flower stem supporter comprising:

a clasping mechanism integral with a long vertical portion, said clasping mechanism comprising a pair of cooperating loops serving to clasp the flower stem snugly between said pair of loops;

said long vertical portion being integral with a blossom supporter;

said blossom supporter being continuous with a short vertical portion.

2. The flower stem supporter of claim 1, wherein the clasping mechanism further comprises a first vertical loop and a second vertical loop, said first and second loops being adapted to be pinched together to snugly hold a flower stem, said first and second loops resembling butterfly wings.

3. The flower stem supporter of claim 1, wherein the first vertical loop and the second vertical loop are malleable.

4. The flower stem supporter of claim 1, wherein the long vertical portion having a length between ¼ inch and twelve inches.

5. The flower stem supporter of claim 1, wherein the length of the long vertical portion is approximately seven inches.

6. The flower stem supporter of claim 1, wherein the blossom supporter is semi-circular.

7. The flower stem supporter of claim 1, wherein the short vertical portion has a length between ⅛ inch and ½ inch.

8. The flower stem supporter of claim 7, wherein the length of the short vertical portion is approximately ¼ inch.

9. A flower stem supporter comprising:

a continuous rod having a first short vertical portion extending downward to a first short horizontal portion;

the short horizontal portion extending outwardly a first downwardly long vertical portion having a lower end;

the lower end of the first downwardly long vertical portion extending to an upwardly extending portion, the upwardly extending portion extending to a second short horizontal portion, the second short horizontal portion extending to a downwardly extending portion, thereby forming a loop, said loop serving to clasp the flower stem;

the downwardly extending portion extending to a second upwardly extending long vertical portion;

the second upwardly extending long vertical portion extending to a third short horizontal portion;

the third short horizontal portion extending to a fourth short horizontal portion;

the fourth short horizontal portion extending to a second short vertical portion.

10. The flower stem supporter of claim 9, wherein the first short vertical portion and the second short vertical portion serves to clasp the stem of said flower.

11. A flower stem supporter comprising:

a clasping mechanism integral with a long vertical portion, said clasping mechanism comprising a first means for clasping and second means for clasping, said first means and said second means cooperating to clasp the flower stem snugly between said first means and said second means;

said long vertical portion being integral with a blossom supporter;

said blossom supporter being continuous with a short vertical portion.

12. The flower stem supporter of claim 11 wherein said first clasping means comprise the lower portion of said long vertical portion and wherein said second means comprise a loop integral with said lower portion.

13. The flower stem supporter of claim 11 wherein said first clasping means comprise a first loop integral with said long vertical portion and said second clasping means comprise a second loop integral with said long vertical portion, said first and second loops cooperating to clasp the flower stem snugly between said loops.

* * * * *